(12) United States Patent
Boex

(10) Patent No.: US 11,453,192 B2
(45) Date of Patent: Sep. 27, 2022

(54) PROTECTIVE PACKAGING PRODUCT

(71) Applicant: FLEXI-HEX LIMITED, Porthleven (GB)

(72) Inventor: Sam Boex, Porthleven (GB)

(73) Assignee: FLEXI-HEX LIMITED

( * ) Notice: Subject to any disclaimer, the term of this patent is extended or adjusted under 35 U.S.C. 154(b) by 295 days.

(21) Appl. No.: 16/485,843

(22) PCT Filed: Feb. 20, 2018

(86) PCT No.: PCT/GB2018/050444
§ 371 (c)(1),
(2) Date: Aug. 14, 2019

(87) PCT Pub. No.: WO2018/154291
PCT Pub. Date: Aug. 30, 2018

(65) Prior Publication Data
US 2020/0055272 A1   Feb. 20, 2020

(30) Foreign Application Priority Data

Feb. 21, 2017  (GB) ...................................... 1702806

(51) Int. Cl.
*B32B 3/12* (2006.01)
*B32B 7/05* (2019.01)
*B32B 29/00* (2006.01)

(52) U.S. Cl.
CPC .................. *B32B 3/12* (2013.01); *B32B 7/05* (2019.01); *B32B 29/005* (2013.01); *B32B 2250/26* (2013.01); *B32B 2305/024* (2013.01); *B32B 2553/00* (2013.01)

(58) Field of Classification Search
CPC .......... B32B 3/12; B32B 7/05; B32B 29/005; B32B 2250/26; B32B 2305/024; B32B 2553/00; Y10T 428/236; Y10T 428/24149; Y10T 428/24165; B31D 3/0284;
(Continued)

(56) References Cited

U.S. PATENT DOCUMENTS 2,020,339 A  *  11/1935  Straub .................. B65D 1/0223
206/457
3,044,679 A  *  7/1962  Wheeler ............ B65D 5/48026
229/120.31
(Continued)

FOREIGN PATENT DOCUMENTS

| CN | 107401090 | 11/2017 |
|---|---|---|
| GB | 1001804 | 8/1965 |
| WO | WO 2011/075830 | 6/2011 |

*Primary Examiner* — Catherine A. Simone
(74) *Attorney, Agent, or Firm* — Galbreath Law Offices, P.C.; John A. Galbreath

(57) ABSTRACT

The protective packaging product includes superimposed upper and lower honeycomb layers 1 and 2 extending between a pair of flexible side members 3 and 4. Each honeycomb layer is formed of flexible paper strips arranged face-to-face and bonded to each other at a series of spaced attachment locations. The honeycomb layers are expandable to form an array of hexagonal cells which are open at both ends. An item such as a surfboard can be inserted between the layers 1 and 2 so that the layers and the flexible side members conform to the shape of the surfboard and protect it against impact damage.

16 Claims, 3 Drawing Sheets

(58) Field of Classification Search
CPC ........ D21H 27/10; B65B 27/08; B65B 35/50; B65B 35/52
See application file for complete search history.

(56) References Cited

U.S. PATENT DOCUMENTS 3,594,989 A * 7/1971 Bastiaans .................. B03C 3/45
                                                               96/85
5,540,972 A * 7/1996 Jaegers ................ B31D 3/0292
                                                             428/116

* cited by examiner

PROTECTIVE PACKAGING PRODUCT

TECHNICAL FIELD OF THE INVENTION

This invention relates to a packaging product which is suitable for protecting items such as surfboards.

BACKGROUND

Surfboards are costly items and they are very susceptible to damage in transit and storage. Surfboards are generally manufactured in various shapes and sizes which manufacturers hold in stock ready to be sent out to shops on receipt of an order. Increasingly, surfboards are being offered for sale on the internet so that they need to be exported to customers throughout the world. Existing packaging products are available which provide protection for the edges of the surfboard in storage and transit but this still leaves large areas which are susceptible to damage. More often than not, even with high value surfboards packaging is contrived from cardboard and bubble wrap which often gives inadequate protection, looks unprofessional, takes up considerable storage space prior to use, and is time-consuming to apply and remove.

The present invention seeks to provide a new and inventive form of packaging product which addresses at least some of the drawbacks of existing packaging.

SUMMARY OF THE INVENTION

The present invention proposes a packaging product which includes superimposed upper and lower honeycomb layers extending between a pair of flexible side members.

In a preferred embodiment each honeycomb layer comprises a plurality of flexible strips arranged face-to-face and attached to each other at a series of attachment locations spaced lengthwise of the flexible strips.

In a preferred embodiment the attachment locations which are spaced lengthwise of each flexible strip alternate between opposite faces thereof.

In a preferred embodiment the attachment locations and the spaces therebetween are of substantially equal length.

In a preferred embodiment outermost flexible strips at opposite edges of each honeycomb layer are attached to respective flexible side members.

In a preferred embodiment there is a gap between the two honeycomb layers.

In a preferred embodiment the flexible strips are formed of paper.

In a preferred embodiment the flexible paper strips are from 100 to 200 gsm (grams per square metre).

In a preferred embodiment each honeycomb layer is expandable perpendicular to said lengthwise direction to form an open cellular structure.

In a preferred embodiment each honeycomb layer comprises an array of cells which are open at opposite upper and lower faces of the respective honeycomb layer.

In a preferred embodiment each honeycomb layer comprises an array of hexagonal cells In a preferred embodiment the cells have a maximum dimension of 10 to 20 mm.

In a preferred embodiment each of the honeycomb layers is 10 to 50 mm thick.

In a preferred embodiment the flexible side members each comprise a flat strip.

In a preferred embodiment outer faces of the side members carry printed matter.

In a preferred embodiment a generally planar item is inserted between the honeycomb layers.

In a preferred embodiment the generally planar item is a surfboard.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
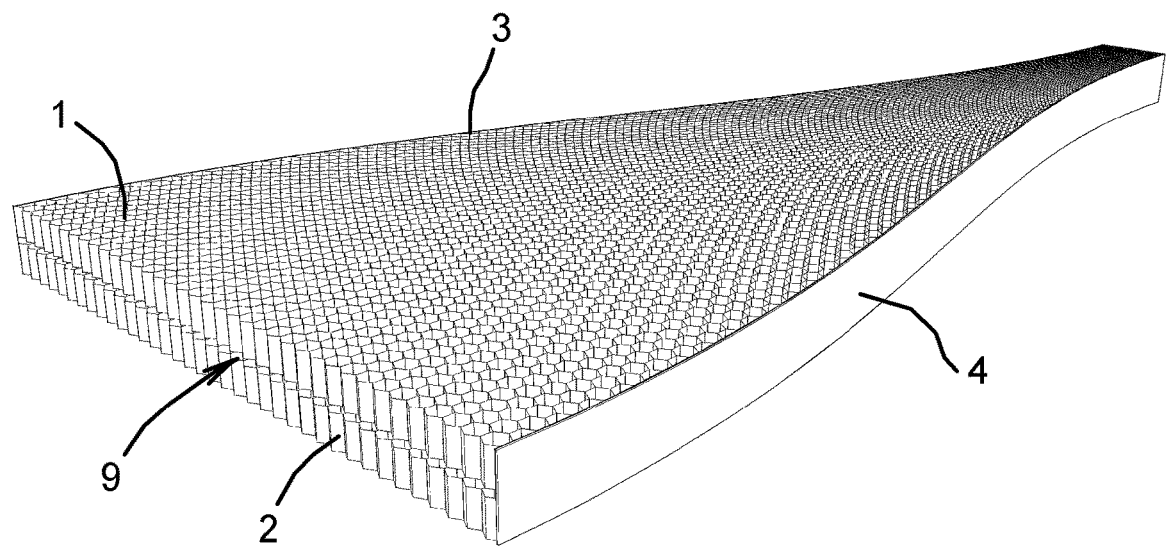
FIG. 1 is a general view of a protective packaging product in a partly-expanded condition.
Figure 2:
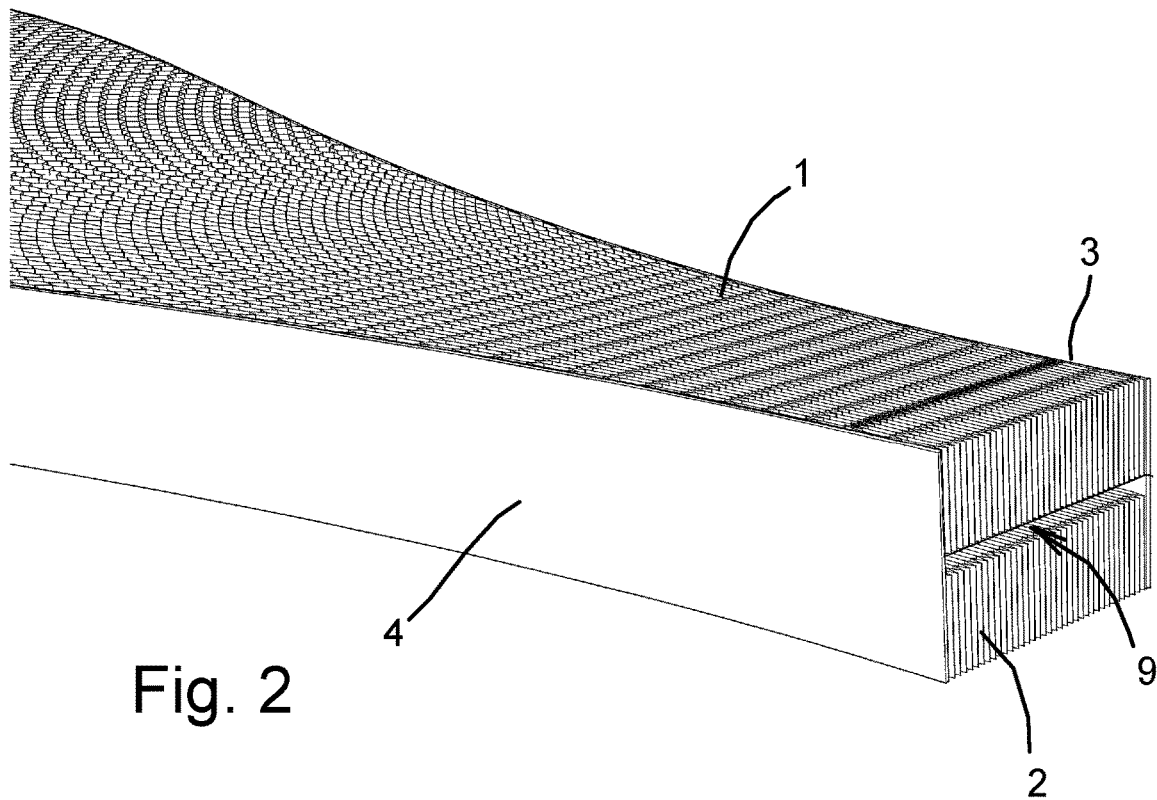
FIG. 2 is an enlarged detail showing the same packaging product from the opposite end.
Figure 3:
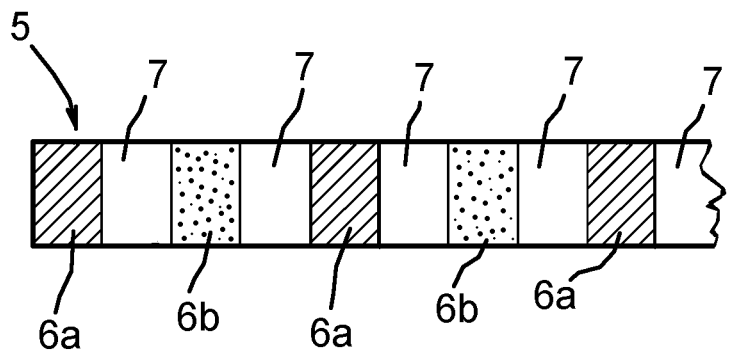
FIG. 3 is a side view showing part of one of the flexible strips used in the packaging product.
Figure 4:
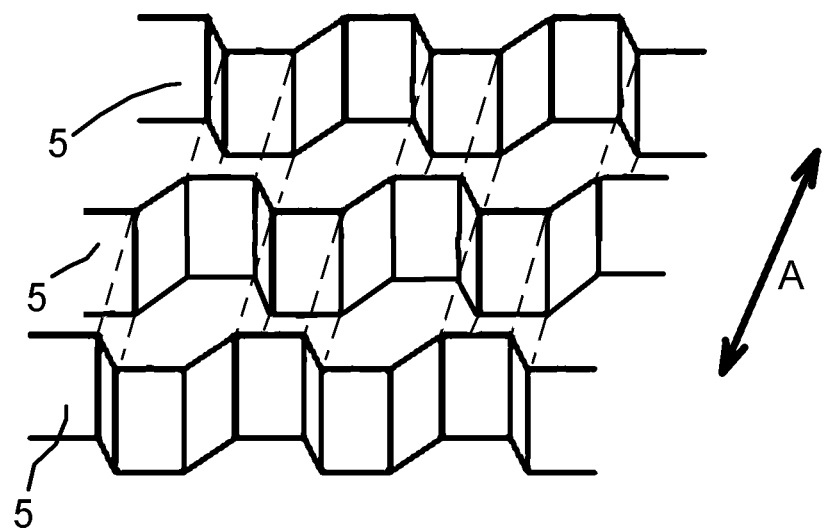
FIG. 4 is an exploded view showing three of the flexible strips in the configurations which they adopt when the product is expanded.
Figure 5:
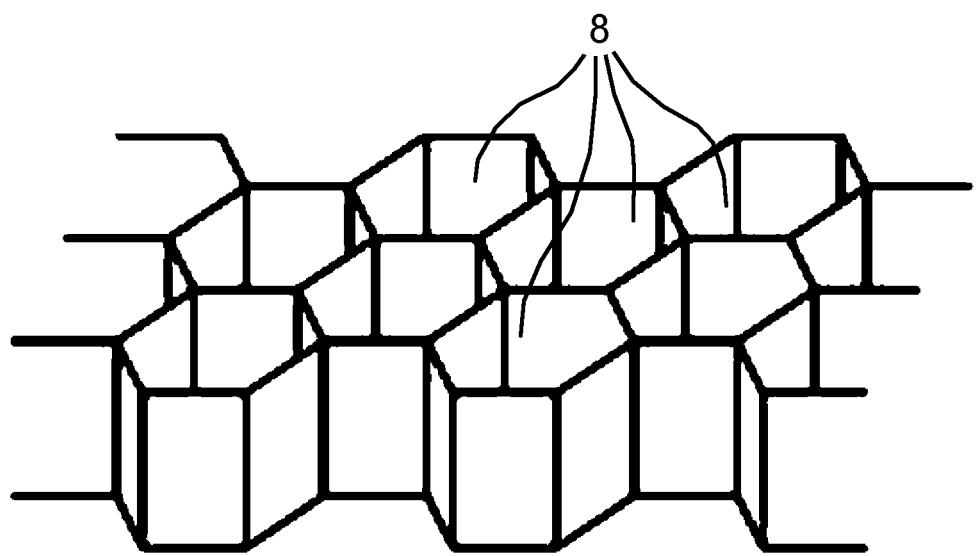
FIG. 5 is a detail of part of the packaging product showing the honeycomb cellular structure in the expanded configuration.
Figure 6:
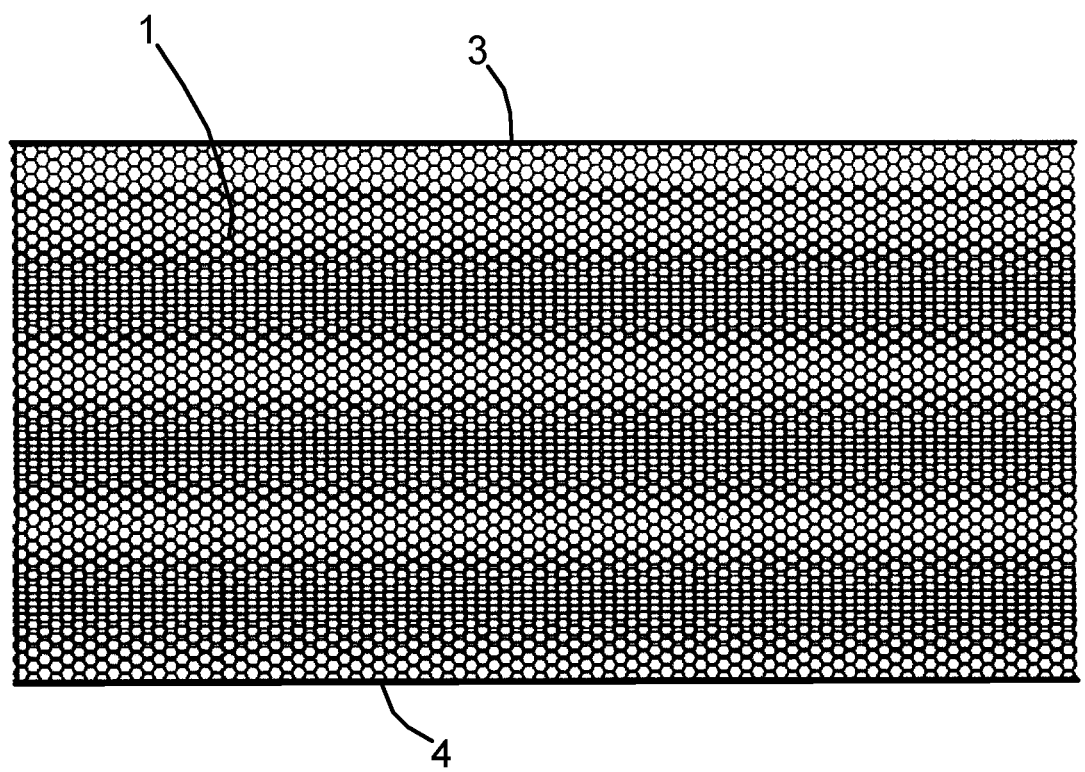
FIG. 6 is a plan view of the complete packaging product in a fully-expanded condition.

Referring to FIGS. 1 and 2, the protective packaging product includes upper and lower honeycomb layers 1 and 2 which extend between a pair of flexible side members 3 and 4. The honeycomb layers 1 and 2 are substantially identical and are each formed from flexible strips 5, one of which is shown in FIG. 3. The strips may be formed of paper, preferably recycled paper, typically 120 or 140 gsm, although thicknesses from about 100 gsm to 200 gsm may be used. The flexible strips may typically be about 20 mm wide, the preferred range being from 10 to 50 mm, and are glued or otherwise bonded to each other, face-to-face. The strips are bonded at a series of substantially rectangular attachment locations 6a and 6b which are spaced lengthwise of the strips with intervening gaps 7. The attachment locations alternate between opposite faces of each strip such that, as indicated in the drawing, the attachment locations 6a on one side of the strip alternate with attachment locations 6b on the opposite side of the strip. The attachment locations 6a and 6b and the intervening gaps 7 are preferably of substantially the same length. When the strips are bonded to each other they can deform as shown in the expanded view of FIG. 4. The unbonded areas of the adjacent strips can move apart so that the respective layer is therefore able to expand in direction A, perpendicular to the lengthwise direction of the unexpanded strips, forming an open cellular structure similar to a honeycomb as shown in FIG. 5. The layers 1, 2 thus provide an array of hexagonal cells 8 which are open at opposite upper and lower faces of the respective layer. When fully expanded the dimension of the cells perpendicular to the lengthwise direction of the strips is typically about 15 mm, although a range of 10 to 20 mm would be suitable.

Referring back to FIGS. 1 and 2, the outermost strips 5 at opposite edges of each honeycomb layer 1 and 2 are glued or otherwise attached to the respective flexible side members 3 and 4. The side members may comprise strips of triple-ply card or cardboard, preferably formed of recycled materials, typically 1.15 metres by 45 mm. The side members are stiffer than the strips 7 whilst still being sufficiently flexible to adopt a curved profile as shown. The upper and lower honeycomb layers 1 and 2 are thus superimposed upon each other with a small intervening gap 9, typically about 5 mm, between their opposing faces, but the gap 9 remains accessible at both ends of the packaging product, as shown.

In an unexpanded state, as at the right hand end in FIG. 2, the overall dimensions of the packaging product are typically about 1.15 metres long by 45 mm high by 45 to 50 mm wide. The size of the unexpanded product is therefore very convenient for shipping and storage, as well as being of low weight. When expanded to its maximum dimension as shown in FIG. 5, the width of the product between the flexible side members 3 and 4 increases to about 800 mm.

When it is desired to protect a generally planar item such as a surfboard the item is inserted into the gap 9 between the honeycomb layers at one end of the packaging product, which causes the gap to expand so that the upper and lower layers 1, 2 and the flexible side members 3, 4 move apart. The small gap 9 between the two layers makes it easier to insert items between the two honeycomb layers. Due to their inherent tension the layers 1, 2 and the side members 3, 4 closely conform to the external shape of the surfboard, which thus minimises the volume of the packaged item. The honeycomb layers and side members act to spread any impacts and thereby protect the packaged item from impact damage. In addition, the honeycomb may crumple under localised impacts which again helps to absorb impact loads.

For packaged items which are more than about one metre in length, two or more of the packaging products can be used end-to-end to fully enclose the item. The adjacent ends of the packaging products can conveniently be taped together and the ends sealed using standard packaging tape.

No additional packaging or wrapping is usually necessary. The outer faces of the side members 3 and 4 are suitable to carry printed matter identifying the product manufacturer and contents. An address label may be securely affixed to the side members if desired.

Although the packaging product is particularly useful for packaging surfboards it can also be used for packaging other planar items such as bodyboards, SUP boards, windsurfer parts, paintings, sheet of glass, marble or the like.

Whilst the above description places emphasis on the areas which are believed to be new and addresses specific problems which have been identified, it is intended that the features disclosed herein may be used in any combination which is capable of providing a new and useful advance in the art.

The invention claimed is:

1. A packaging product which includes expandable superimposed upper and lower honeycomb layers (1, 2) extending between a pair of flexible side members (3, 4), characterised in that the flexible side members (3, 4) are two separate and discrete elongate flat strips which are respectively attached to opposite edges of both superimposed honeycomb layers (1, 2), whereby, when said honeycomb layers are expanded, the flexible side members can each move independently of the other to adopt a curved profile, and wherein there is a gap (9) between the two honeycomb layers (1, 2), extending between the flexible side members (3, 4), allowing opposing faces of the two honeycomb layers (1, 2) to move apart when an item is inserted into the gap.

2. A packaging product according to claim 1 in which each honeycomb layer comprises a plurality of flexible strips (5) arranged face-to-face and attached to each other at a series of attachment locations (6*a*, 6*b*) spaced lengthwise of the flexible strips.

3. A packaging product according to claim 2 in which the attachment locations (6*a*, 6*b*) which are spaced lengthwise of each flexible strip (5) alternate between opposite faces thereof.

4. A packaging product according to claim 2 in which the attachment locations (6*a*, 6*b*) are spaced lengthwise of each flexible strip (5) with intervening gaps (7), and the attachment locations and said intervening gaps are of substantially equal length.

5. A packaging product according to claim 2 in which outermost strips (5) at opposite edges of each honeycomb layer (1, 2) are attached to respective flexible side members (3, 4).

6. A packaging product according to claim 2 in which the flexible strips (5) are formed of paper.

7. A packaging product according to claim 2 in which each honeycomb layer (1, 2) is expandable perpendicular to said lengthwise direction to form an open cellular structure.

8. A packaging product according to claim 1 in which each honeycomb layer (1, 2) comprises an array of cells (8).

9. A packaging product according to claim 8 in which the cells (8) are open at opposite upper and lower faces of the respective honeycomb layer.

10. A packaging product according to claim 1 in which each honeycomb layer (1, 2) comprises an array of hexagonal cells (8).

11. A packaging product according to claim 1 in which outer faces of the flexible side members (3, 4) carry printed matter.

12. A packaging product according to claim 1 having a generally planar item inserted between the honeycomb layers (1, 2).

13. A packaging product according to claim 12 in which the generally planar item is a surfboard.

14. A packaging product which includes expandable superimposed upper and lower honeycomb layers (1, 2) extending between a pair of flexible side members (3, 4), characterised in that the flexible side members (3, 4) are two separate and discrete elongate flat strips which are respectively attached to opposite edges of both superimposed honeycomb layers (1, 2), whereby, when said honeycomb layers are expanded, the flexible side members can each move independently of the other to adopt a curved profile, in which each honeycomb layer comprises a plurality of flexible strips (5) arranged face-to-face and attached to each other at a series of attachment locations (6*a*, 6*b*) spaced lengthwise of the flexible strips, in which the flexible strips (5) are formed of paper, and in which the flexible paper strips (5) are from 100 to 200 gsm (grams per square metre).

15. A packaging product which includes expandable superimposed upper and lower honeycomb layers (1, 2) extending between a pair of flexible side members (3, 4), characterised in that the flexible side members (3, 4) are two separate and discrete elongate flat strips which are respectively attached to opposite edges of both superimposed honeycomb layers (1, 2), whereby, when said honeycomb layers are expanded, the flexible side members can each move independently of the other to adopt a curved profile, in which each honeycomb layer (1, 2) comprises an array of cells (8), and in which the cells (8) have a maximum transverse dimension of 10 to 20 mm.

16. A packaging product which includes expandable superimposed upper and lower honeycomb layers (1, 2) extending between a pair of flexible side members (3, 4), characterised in that the flexible side members (3, 4) are two separate and discrete elongate flat strips which are respectively attached to opposite edges of both superimposed honeycomb layers (1, 2), whereby, when said honeycomb layers are expanded, the flexible side members can each move independently of the other to adopt a curved profile, in which each of the honeycomb layers (1, 2) is 10 to 50 mm thick.

\* \* \* \* \*